United States Patent [19]

Wykoff

[11] 4,360,051
[45] Nov. 23, 1982

[54] PNEUMATIC TIRE AND TIRE CARCASS, SOME HAVING DIRECTIONAL OTHERS HAVING NON-DIRECTIONAL OPERATIONAL CHARACTERISTICS

[76] Inventor: Clyde R. Wykoff, 1929 Ganyard Rd., Akron, Ohio 44313

[21] Appl. No.: 277,052

[22] Filed: Jun. 24, 1981

Related U.S. Application Data

[63] Continuation-in-part of Ser. No. 104,047, Dec. 17, 1979, abandoned.

[51] Int. Cl.$^3$ .............................. B60C 9/06; B60C 9/20
[52] U.S. Cl. ............................. 152/356 R; 152/354 R; 152/361 R
[58] Field of Search ......... 152/330 R, 354 R, 354 RB, 152/355, 356 R, 356 A, 361 R; 156/123 R, 123 A, 133

[56] References Cited

U.S. PATENT DOCUMENTS

| | | | |
|---|---|---|---|
| 2,703,128 | 3/1955 | Darrow | 152/356 |
| 2,703,132 | 3/1955 | Darrow | 152/356 |
| 3,286,758 | 11/1966 | Svereckis et al. | 152/356 |

FOREIGN PATENT DOCUMENTS 947207  1/1964  United Kingdom ................ 152/356

*Primary Examiner*—Edward C. Kimlin
*Assistant Examiner*—Lois E. Boland
*Attorney, Agent, or Firm*—Oldham, Oldham, Hudak & Weber, Co.

[57] ABSTRACT

Confluent ply pneumatic tires including a tire carcass having a crown area and a tire tread on the tire carcass which includes a plurality of confluent two piece plies, each confluent ply piece being anchored at the opposite side of said carcass thereof, one to each of the tire beads and with the tire cords being positioned in the cured tire at uniform bias angles between 2° and 29° inclusive to a radial line at the center line area of the carcass. These "confluent ply" assemblies have each piece extend from one bead up to and across the crown area to terminate short of the opposite tire sidewall, the tire having the cords in these bias plies at the center crown area at one specific bias angle to a tire radius line where all of such cord angles of each individual "confluent ply" piece are inclined in one rotary direction of the tire. The pneumatic tire carcass of the invention may include a plurality of "confluent ply" cord assemblies wherein the cord angles of said ply assemblies are inclined in opposite rotary direction to an even number or to the majority of the confluent plies in the tire and carcasses also may include conventional belt plies and known reinforcing plies positioned therein in normal manners.

10 Claims, 5 Drawing Figures

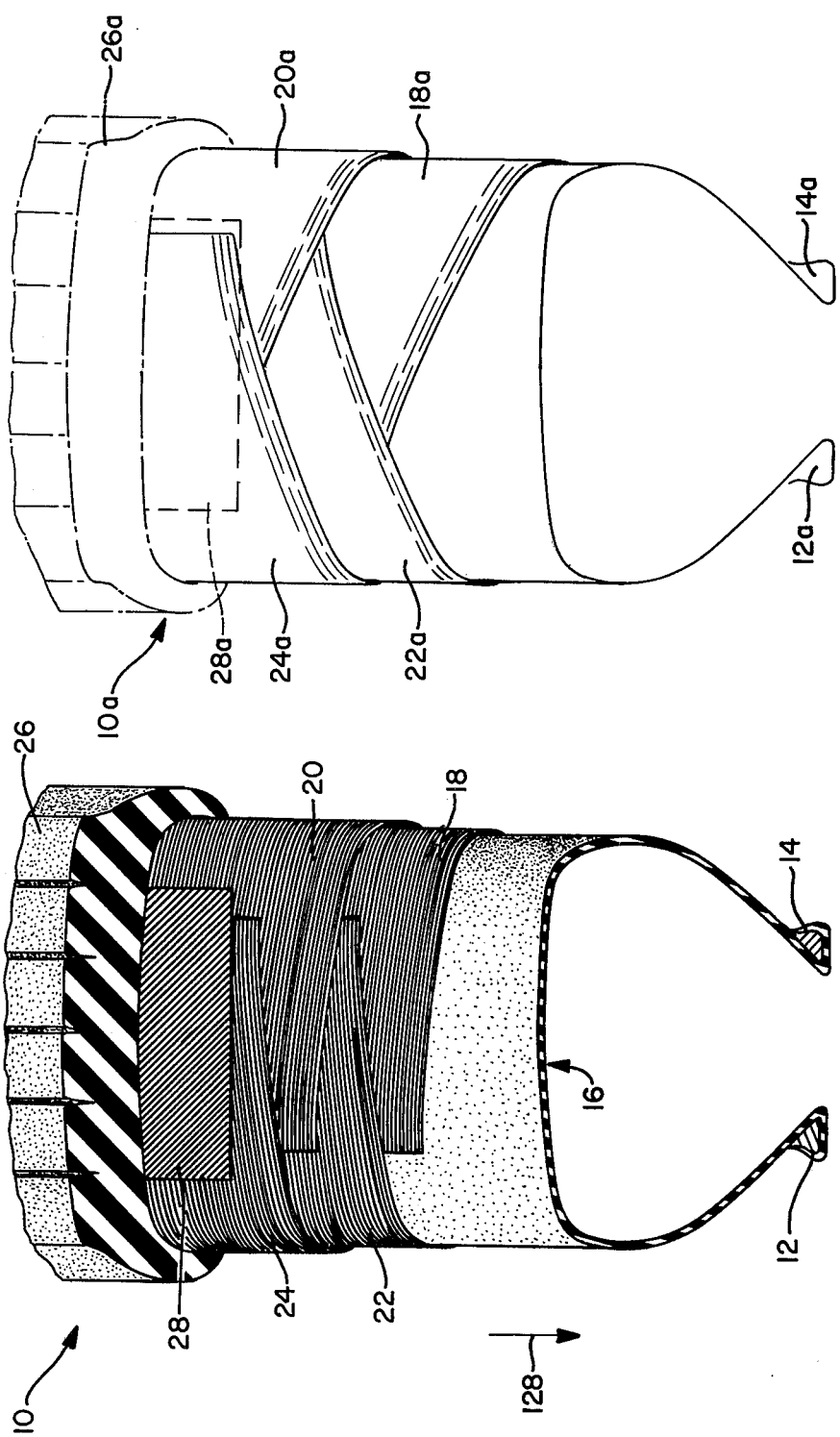

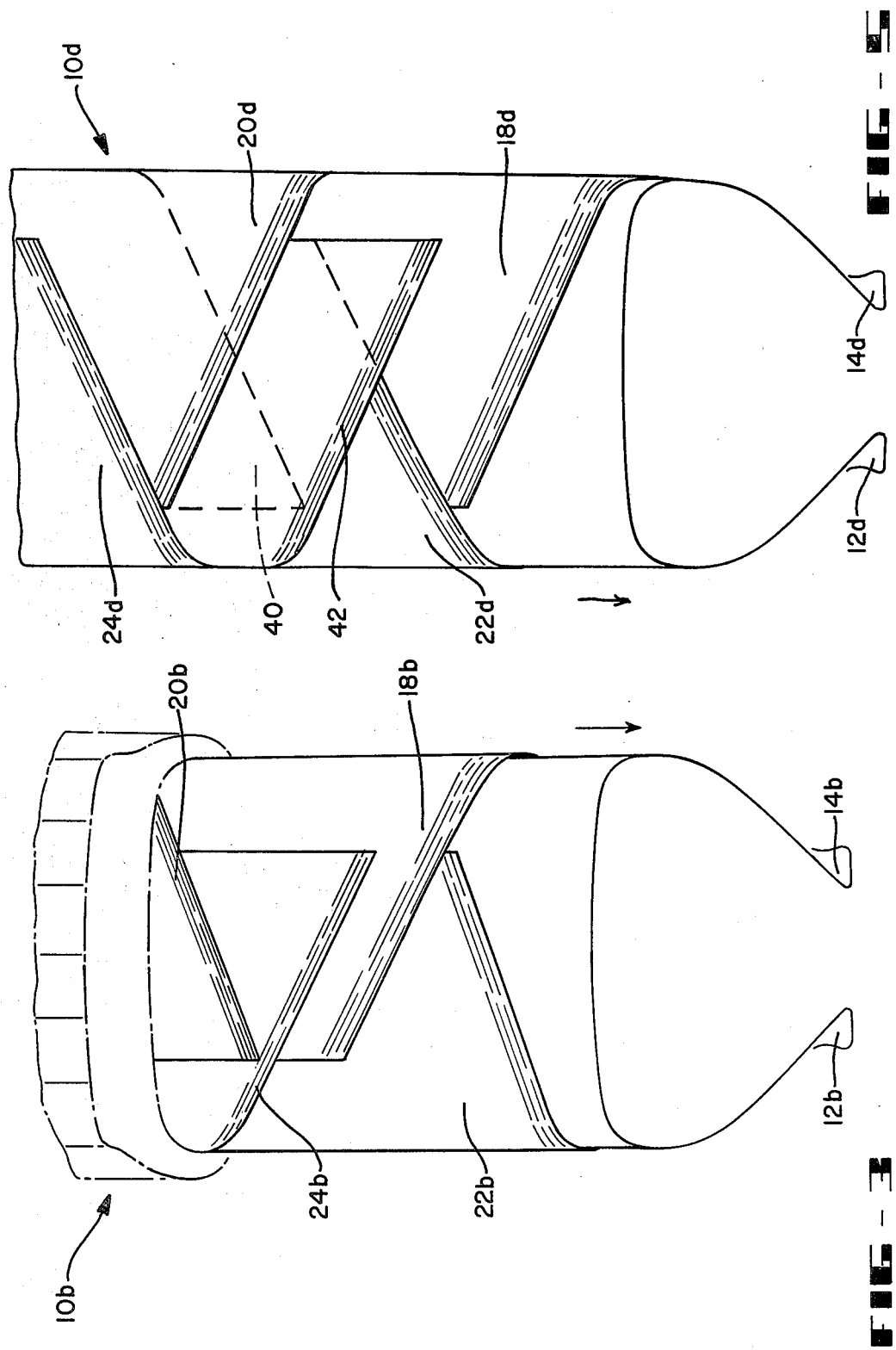

PNEUMATIC TIRE AND TIRE CARCASS, SOME HAVING DIRECTIONAL OTHERS HAVING NON-DIRECTIONAL OPERATIONAL CHARACTERISTICS

CROSS-REFERENCE

This application is a continuation-in-part of my earlier application filed Dec. 17, 1979 under U.S. Ser. No. 104,047, now abandoned, entitled "Pneumatic Tire and Tire Carcass, Some Having "Directional," Others Having Non-Directional Operational Characteristics."

BACKGROUND ART

Heretofore there have been many different tire constructions and tire designs proposed. A number of tire tread designs have also been proposed heretofore and some tire tread traction designs have provided directional tread surface operating characteristics therefor to improve tire tread traction performance. Various constructions of "tire carcasses" have been provided utilizing combinations of bias ply cords, radially directed cords, breaker strips, belt plies or the like but none have had any success as designed or patented, therefore none have been "reduced to production." One main problem that is encountered in all pneumatic tire service is that of the rolling resistance of the tire, and efforts have been, and are, continually being made to reduce the rolling resistance of pneumatic tires. It is a known fact that operation of a bias tire under load at increasing speeds causes a buildup or slight roll or ridge of the plastic rubber in the tire tread to be created immediately prior to the portion of the tread in road engaging contact. This little rib or roll of the tread is continuously changing as the tire RPM increases with vehicle speed, and such little rib or accumulation of rubber material from the tire tread is part of the reason why rolling resistance exists in tires and, obviously, the resistance to rolling of the tire is a negative factor insofar as operational mileage from the tire and/or vehicle on which the tire is mounted is concerned. It may be said that operation of the tire could be compared to the forcing or pulling the tire through a wringer since the tire is compressed under load and continually moves in relation to its support surface. Hence, this little roll or rib of rubber tread material that is formed just prior to the tire tread area contacting the road surface must be pulled down into a flat tread profile during road engaging contact.

One approach to improved tire constructions, to improved tire operational characteristics, and to improved riding characteristics, softness and comfort have resulted in the provision of a number of different tire carcass designs. One of such tire constructions is shown in U.S. Pat. No. 3,286,758, wherein the tire cords are primarily laid to extend radially of the tire carcass, but the tire cord plies are made of such length that the plies are folded up around a bead at each end of the ply. This causes the cords that were radially directed in the main portion of the ply to assume some small acute angle to a radial line, so that the two ends of the ply being folded up over the tire can be made of such length as to overlap each other at different bias angles for approximately the tread width area of the tire. Additionally, any suitable belt plies can be used in the tire, normally between the tire carcass and the tread portion of the tire. This cured tire construction contains both *radial and bias positioned* cord reinforcement plies. This radial and bias tire combination creates unequal internal cord stresses in the sidewall that are self-destructive in tire service.

Another approach to pneumatic tire carcass design, as proposed in the past, has used a split ply wherein only one end of the cords in any given ply are secured to one bead and the other ends of the cords in the ply are, in effect, freely floating in the tire. One representative construction of this type is shown in U.S. Pat. No. 2,703,128, and other illustrations of such type of split plies in tires are shown in U.S. Pat. No. 2,703,132. However, in both of such prior patents, the cords in the sectional plies that are diagonally or circumferentially adjacent each other, extend in the same or parallel direction so that the two sets of cords provided in two different and adjacent plies, and where the cords are in overlapped axial relationship to each other, do combine when overlapped to form a continuous ply extending from bead to bead of the tire.

As indicated, even though there have been a large number of widely different types of tire carcass designs proposed and patented, none have been "Reduced to Production Practice" for the marketplace and there are no bias tire carcass constructions available at this time wherein the *tire carcass* can really provide similarly improved operational benefits, and reduced rolling resistance in the tire, especially when rotated in the preferred direction, as determined by the tire and carcass design.

DISCLOSURE OF INVENTION

It is the general object of the present invention to provide a new and/or improved "Directional Type" tire construction, especially one having "confluent ply" cord assemblies in the tire carcass which will, in operation, have a reduced rolling resistance, especially when operated in a preferred direction in relation to the rolling resistance of the tire when operated in the opposite direction of rotation.

Another object of the invention is to utilize the two piece confluent ply cord assemblies in tires in new manners, and wherein the ply cords of each of the individual "confluent ply" pieces are rotary inclined in one direction of the tire at new bias angles to a radial line of the tire at the center of the carcass crown.

Another object of the invention is to provide a new and novel use of "confluent ply" assemblies that positions or inclines the cords of the "confluent ply assemblies" in opposite rotary directions of the tire, wherein the "confluent ply" pieces overlap in the tread area of the tire and wherein the cords in adjacent overlapped plies terminate at or about the tread area or adjacent shoulder tire area to automatically provide added cord reinforcement similar to belt plies.

Other objects of the invention are to provide a special relationship between the strength of the tire cords, and the rotary direction of the confluent ply cords in a tire carcass in relation to the directional tension on the cords in the tire carcass when the tire is in operation; to provide a tire that has reduced rolling resistance in one direction, in relation to the other; to provide a tire wherein none or a minority of the cords in the tire sidewall area of the individual "confluent ply" assemblies of the carcass are subjected to compression as the tire is forced to rotate; and, to provide improved tire constructions by a novel assembly of "confluent ply" tire carcasses wherein "belt ply" materials are added to increase the rigidity in the tire carcass.

Yet another major object of the invention is to provide a non-directional confluent ply tire carcass construction and one that provides equal tire service in either rotary direction of the tire that can be made by substantially conventional tire building and curing equipment; which tire will have improved operational characteristics; which can contribute to increased economy of operation of a vehicle on which the tire is positioned, and which tire can be more easily molded in a wide range of bias angles and sizes to meet specific tire service requirements.

The foregoing and other objects and advantages of the present invention will be made more apparent as the specification proceeds.

BRIEF DESCRIPTION OF DRAWINGS

Attention now is particularly directed to the accompanying drawings, wherein:

FIG. 1 is a broken away semi-diagrammatic view of a "direction type tire" carcass having a minimum of one and/or added "confluent ply" assemblies embodying the characteristics of the invention and showing the relationship between various components and plies in the tire carcass, and the relative positions of the same and plies that may be present;

FIG. 2 is a diagrammatic representation of the "directional type tire" carcass different than FIG. 1 as modified as to cord bias angles and/or the angular relationship of the cords to a line which is radial of the tire carcass in the cured tire;

FIG. 3 is another diagrammatic illustration of two or more "confluent ply" assemblies as they would be positioned in a further "directional" and/or "non-directional" type tire embodying the invention; the directional type having opposing "confluent ply" cords which are modified as to physical properties, cords per inch and/or type of cord material to achieve required stress differentials and FIG. 3 also illustrates a "non-directional" tire wherein all cords are equal in physical properties;

FIG. 5 is yet a further diagrammatic representation of the use of "confluent ply" assemblies in another "directional" type tire carcass and the angular relationship of the "confluent ply" cords when uneven numbers of 3 or more "confluent ply" assemblies are positioned within the tire carcass. Belt plies may be added to increase carcass rigidity.

When referring to corresponding members shown in the drawings and referred to in the specification, corresponding numerals are used to facilitate comparison therebetween.

BEST MODE FOR CARRYING OUT THE INVENTION

Figure 4:
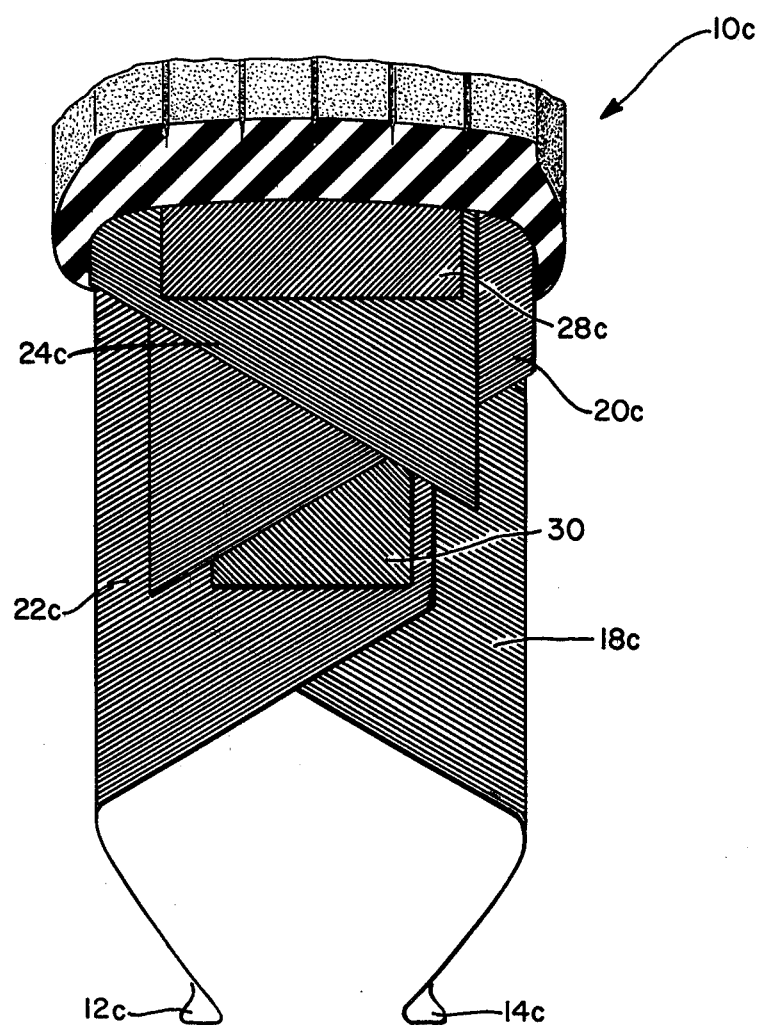
FIG. 4 is another fragmentary semi-diagrammatic view of another "directional" and/or "non-directional" type tire carcass of the invention, and showing "confluent ply" assemblies having belt ply materials added and therein broken away to show the tire carcass construction, and wherein there is a plurality of "confluent ply" assemblies and a like number of said "confluent ply" assemblies and are inclined in opposite rotary direction of the tire.

When discussing the bias angle of the cords in different "confluent ply" assemblies in the tire carcass of the tires of the invention, I am referring to the angles that these cords make at the crown or tread center area of the cured tire carcass with a line or plane that extends perpendicularly from the tire beads or radially of the tire, for example, a radial tire cord has a zero bias angle in either case. Obviously, when referring to various tire carcasses and the components thereof, the tire cord material can be made of any number of substances known or used in the field today, and conventional equipment can be used for forming the tire cords and tire plies. Any suitable tire treads, sidewalls and other known components of the tire, including beads and any type of belt ply or the like may be used in the tire, and all may be made from known material built into the tire in conventional manners. All ply sequence application and ply step-off of prior art are included options in the tire of the present invention.

Bias angle ranges as specifically claimed will range from high to low, are optional for compatibility with tire and mold designs for specific tire service and testing requirements.

A "directional" type pneumatic tire, one having a preferred direction of rotation, comprising a tire carcass having a crown area and a tire tread on the tire carcass, the carcass having beads in it, and wherein the tire carcass includes one or more two piece confluent ply assemblies with each individual ply piece being anchored at one side thereof to only one of the tire beads and with the tire cords therein being positioned at a specific bias angle to a radial line at the center of the crown area of the carcass. The "confluent ply" pieces each extend from one bead up to and across the crown area of the tire carcass and terminate short of the opposite tire sidewall, the tire having the cords in all of the individual "confluent ply" assemblies extending from the tire beads at respectively equal bias angles to a tire radius line and wherein all or a majority of confluent ply assemblies may be inclined in one rotary direction of the tire. A "non-directional" type pneumatic tire of the invention, one without a preferred direction of rotation includes a plurality of two piece "confluent ply" assemblies as previously described, wherein a like number of "confluent ply" assemblies are inclined in opposite rotary direction of the tire with the cords therein extending from the tire beads to respectively equal bias angles to a radial line at the center of the carcass, which also may include conventional belt ply materials positioned therein in a normal manner.

Reference now is particularly directed to the accompanying drawings, wherein FIG. 1 indicates a "directional" type pneumatic tire indicated as a whole by the numeral 10. This tire 10 may also be termed a "Directional Belted Confluent Ply" tire and it is shown rather diagrammatically in FIG. 1. It includes beads 12 and 14 and a tread, carcass and inner liner, indicated as a whole by the numeral 16. This treaded carcass and inner liner particularly includes the first piece of a two piece "confluent ply" assembly wherein with said ply piece 18 being secured to the tire bead 14 in the usual manner and extending up over the crown area of the tire at a bias angle range of 2° to 29° inclusive to a line or plane which is radial in the tire carcass. The other piece 22 of the "confluent ply" assembly is anchored in a conventional manner to the tire bead 12 and it extends up from such tire bead into the tire carcass and over the crown area thereof, but with the cords in such ply being inclined in the opposite rotary direction of the tire at, bias angles respectively equal to the cords in the first "confluent ply" piece 18. High rigidity, conventional belts are added and a tread 26 and other finishing rubber layers are suitably secured to the completed carcass to aid in forming the tire 10 and are positioned in the tire in a conventional manner. The tread and associated sidewalls, etc. are made from conventional materials and are secured in the tire carcass in known manners.

If required for carcass strength, or increased load carrying properties, or for tire speeds, etc., additional two piece "confluent ply" assemblies can be present with confluent ply piece 20 being like ply piece 18 and "confluent ply" piece 24 being like ply piece 22.

By the tire construction shown in FIG. 1, it will be seen that all of the "confluent ply" pieces 18, 20, 22 and 24, each have one unsecured lateral edge and all of these pieces have cords extending from one of the beads to and across the center line of the crown area of the tire carcass. The cords in all of these bias plies, however, extend from their associated tire beads so as to have the same respectively small, inclination or bias angle that may range from 2° to 29° inclusive to a radial line in the center of the cured tire, and to have such "confluent ply" cord assemblies all extend in one rotary direction of the tire from the tire beads.

The bias angle of the cords in the plies of the cured tire can range from a minimum angle of about 1° to 9° at the tire beads up to 2° to 29° inclusive to a radial line at the center of the tire crown area and the bias angle is measured in that manner. By this particular type of a tire construction, all of the cords in the tire sidewall areas are under tension at all times as long as the tire is being rotated in the direction indicated by the arrow 128, so that reduced rolling resistance is obtained by this particular tire construction. If for some reason high rolling resistance is desired, then the tire should rotate in the direction opposite to that indicated by the arrow 128. These ply cords in the various plies of the directional tire do not intersect in the tire sidewall flexing areas of the tire carcass. The bias angle of the various cords in the plies are adjustable so as to cooperate with various degress of stiffness provided by any belt plies in the tire, the internal tire pressure to be used, the tire rolling resistance desired, revolutions per minute proposed for the tire, etc. to obtain the desired riding properties. The tire of the invention may have a plurality of conventional belt plies 28 of fabric or steel cords and positioned therein below the tread of the tire to form a confluent belted tire, but if such ply is omitted, as it may be, the tire would be a confluent ply tire. Any suitable plurality of two piece confluent ply assemblies may be used, as desired.

A modification of this confluent ply tire of the invention is a non-directional type tire, one that is designed with equal carcass strength in each rotary direction of the tire as indicated diagrammatically in FIG. 3 of the drawings, wherein confluent ply tire 10b is shown and it includes a confluent ply piece 18b attached to tire bead 14b and its companion confluent ply piece 22b is secured to the tire bead 12b with the cords in each of these two confluent ply pieces being at opposite but uniform bias angles. However, the cords in the next radially adjacent confluent ply piece 24b are positioned at the same bias angle but in opposite rotary direction of the tire and have the same physical properties and cord count as the cords in the ply piece 22b and then the cords in the final confluent ply piece 20b are positioned at a bias angle equivalent to that of the cords in the ply piece 18b but in opposite rotary direction to provide a balanced two ply confluent ply tire. A plurality of said balanced two ply confluent ply tire carcasses are added as needed to increase the tires load carrying capacity.

However, all of the ply pieces have one lateral edge thereof secured to a bead and all pieces have cords extending from the tire bead up to and across the crown area of the tire. This tire 10b obviously has a conventional tread and sidewall provided thereon and the diagrammatic illustration of the tire does not indicate any belt ply or breaker strips in the tire but these can be provided as desired.

Another feature of the invention 10b, is a directional type pneumatic type tire, one having a preferred direction of rotation, this tire design is shown in FIG. 3. However confluent ply cords in pieces 18b and 22b are directionally positioned to resist torsional stress in the forward tire motion and must have physical capabilities for providing greater resistance to these torsional forces than the confluent ply cords positioned in the opposing rotary or reverse rotary direction of tire motion, i.e. ply pieces 20b and 24b. Such resistance or differential between forward and reverse travel direction of the tire can be accomplished by different physical properties in similar cord materials, or different compositions of cord materials for the pieces 18b and 22b in relation to 20b and 24b, or the use of greater cord counts per inch of ply width can be used to achieve this greater physical capability or strength in the confluent ply assembly formed from pieces 18b and 22b.

The present invention provides more flexibility in tire designs as by use of more ply belts, with 50% reduction in ply belt stepoffs. The present design can also use a greater variety of cord bias angles to accommodate specific mold designs of varying sectional width ratios; and more variety in tire cord materials and tire cord properties and special tire service requirements can be obtained by the designs of the present invention.

FIG. 4 of the drawings shows a further modified embodiment of the tire of the invention indicated by the numeral 10c. This confluent ply non-directional type tire 10c is provided with additional confluent ply assemblies and/or belt plies, as desired, to provide various options to improve a tire's load capacity and/or service performance characteristics. Particularly, this tire 10c is shown as having two belt plies 28c and 30 provided therein. Obviously, the cords in these bias plies in this tire 10c can be of any type of material or cord design normally used in the art of tire design technology. Thus, specifically, this non-directional tire 10c is shown as including a first confluent ply piece 18c, a second confluent ply piece 22c, a third confluent ply piece 20c positioned so that its cords are inclined in the opposite rotary direction of the cords of the confluent ply piece 18c. The fourth confluent ply piece 24c is positioned so that its cords are inclined in opposite rotary direction to its radially adjacent confluent ply piece 20c and form a tire carcass comprising 2 plies of intersecting cord in the tire sidewall area and a greater plurality of cords plies intersecting in the crown area of the tire.

In the tire of FIG. 4, the ply pieces would be built up on the drum in the order of first confluent ply piece 18c, second confluent ply piece 22c, belt ply piece 30, third confluent ply piece 20c and last confluent ply piece 24c with the top belt plies 28c added after the said ply pieces, as shown.

A confluent ply directional type tire 10d is shown in FIG. 5 as yet a further modified embodiment of the tire construction of the invention. This tire 10d, is comprised of a plurality of confluent ply assemblies having the cords of the first two confluent ply assemblies positioned as in the tire 10a of FIG. 2, and with the third confluent ply assembly being positioned on the top of the first confluent ply assembly and below the second as shown in FIG. 5 and being positioned intermediate therein so that cords of said third confluent ply assembly are inclined in opposite rotary direction of the tire and at respectively equal and common bias angles to a radial line of the tire. Hence, the ply pieces 18d and 20d extend from the tire bead 14d and have the same bias angle, and with the similar bias ply pieces 22d and 24d being suitably anchored to the tire bead 12d. Then the pair of intermediate ply pieces include, respectively, a ply piece 40 anchored to the bead 14d and extending therefrom at the opposite bias angle to its adjacent pieces 18d and 20d, while ply piece 42, normally the fourth ply section applied in the tire carcass, is anchored to the tire bead 12d but extends therefrom at a contrary bias angle to its associated bias ply pieces 22d and 24d. Again, this provides directional tire strengthening characteristics and, it is submitted, reduces the rolling resistance of the tire in the preferred direction of rotation. See "Arrow." This carcass construction improves the load carrying ability of the tire as well as providing a stiffer tire which can have any plurality of said and illustrated groupings of confluent ply assemblies and a suitable number of belt plies therein, positioned in any known or conventional manner.

The tires of the invention can be made on known types of tire building drums including solid metal, expanding metal and/or flexible bladder drums.

The following definitions are respectfully submitted to clarify the specific meaning of the term confluent ply.

Viz: The standard nomenclature used in the art of tire technology, identifies a tire ply or cord body ply as a single piece of calendered cord fabric positioned within the tire's carcass so that the individual cords traverse the entire tire carcass from one bead to the opposite bead.

A confluent ply as the term is used in present inventions and descriptions of the claims, is structurally different than the standard tires, tire body ply. This term identifies a tire ply or cord body ply as two relatively narrower pieces of calendered cord fabric positioned within the tire's carcass so that the individual cords of one said ply piece traverse the tire carcass from one bead (tie-in) and the individual cords of the second said ply piece traverse the tire carcass from the opposite bead (tie-in) and the cords of said ply pieces are angularly positioned at uniform bias angles to form a chevron or "V" pattern as they traverse to the carcass center where they meet and/or overlap as desired but do not extend beyond the tire's crown area.

While several complete embodiments of the invention have been disclosed herein, it will be appreciated that modification of these particular embodiments of the invention may be resorted to without departing from the scope of the invention.

What is claimed is:

1. A directional type pneumatic tire having a preferred direction of rotation comprising
a confluent ply tire carcass having a crown area and having beads therein, and a tire tread on the tire carcass, and wherein said tire carcass includes one two piece confluent ply construction or assembly, with each confluent ply piece including cords and said cords being positioned at a specific bias angle to a radial line at the center of the crown area of the carcass, all of said cords of each confluent ply piece being positioned at one uniform bias angle that ranges between 2° and 29° inclusively for a given tire design, said cords all being inclined in one rotary direction, and a conventional high rigidity belt ply in the tire crown to provide rigidity.

2. A directional type pneumatic tire as in claim 1, where a plurality of confluent ply assemblies are present, and all confluent ply assemblies being inclined in one rotary (or circumferential direction of the tire) direction.

3. A directional type pneumatic tire comprising
a tire carcass having beads and a crown area and a tire tread on the tire carcass and wherein said carcass includes a plurality of confluent ply assemblies and said carcass is comprised of a like number of said confluent ply assemblies which are inclined in opposite rotary (or circumferential) directions of the tire and all cords in said confluent ply assemblies are positioned at a specific bias angle to a radial line at the center of the crown area of the carcass, all of said cords being positioned at a uniform bias angle and wherein the cords in the confluent ply assemblies which are inclined in one rotary direction have lesser strength than the cords in the confluent ply assemblies that are inclined in the opposite rotary direction.

4. A directional type of a pneumatic tire as in claim 3, where a high rigidity belt ply is positioned in said carcass at the crown area thereof.

5. A non-directional type pneumatic tire, one having a cord carcass that produces equal tire service performance in either direction and comprising
a carcass having beads and a tread on the tire carcass and wherein said carcass includes a plurality of confluent ply assemblies including cords and said carcass is comprised of an even number of confluent ply assemblies and like numbers of said confluent ply assemblies are positioned in opposite rotary directions of the tire and bias angles of the cords are equal.

6. A non-directional type pneumatic tire, one that produces equal tire service performance in either direction of rotation of the tire as in claim 6 and wherein high rigidity belt ply materials are positioned on top of and/or between the confluent ply assemblies.

7. A directional type pneumatic tire, having a preferred direction of rotation comprising
a tire carcass having beads and a tread on the carcass and wherein said carcass is comprised of at least three confluent ply assemblies including cords and wherein a majority number of said confluent ply assemblies are inclined in one rotary direction of the tire leaving the minority number inclined in the other or opposite rotary direction of the tire and bias angles of all the cords are equal.

8. A directional type pneumatic tire as in claim 7, wherein the cords per inch of ply cord width, and/or the strength or physical properties of the cord is different in the confluent ply assemblies which are inclined in one rotary direction than that in the confluent ply assemblies which are inclined in the opposite rotary direction of the tire.

9. A directional type pneumatic tire as in claim 7, where the cords in the confluent ply assembly inclined in the preferred direction of rotation have more cords per inch of ply width than the cords in the confluent ply extending in the opposite direction.

10. A directional type pneumatic tire as in claim 7, where the cords in the confluent ply assembly inclined in the preferred direction of rotation have greater strength or physical properties than the cords in the confluent ply extending in the opposite direction.

* * * * *